United States Patent
Chang

(10) Patent No.: US 8,616,083 B2
(45) Date of Patent: Dec. 31, 2013

(54) CAM WHEEL ASSEMBLY FOR REFRIGERANT RECOVERY MACHINE

(75) Inventor: An-Chao Chang, Lungshou Vill. (TW)

(73) Assignee: Sun-Wonder Industrial Co., Ltd., Kueishan Hsiang, Taoyuan Hsien (TW)

( * ) Notice: Subject to any disclaimer, the term of this patent is extended or adjusted under 35 U.S.C. 154(b) by 0 days.

(21) Appl. No.: 13/231,908

(22) Filed: Sep. 13, 2011

(65) Prior Publication Data

US 2013/0061713 A1  Mar. 14, 2013

(51) Int. Cl.
*F16H 53/06* (2006.01)

(52) U.S. Cl.
CPC .................................... *F16H 53/06* (2013.01)
USPC .................................... 74/569; 74/50; 62/292

(58) Field of Classification Search
USPC ........... 74/50, 567, 568 R, 569, 570.1, 570.3; 62/74, 292; 417/273, 397, 269, 271; 384/13, 26, 42, 7, 142, 145
See application file for complete search history.

(56) References Cited

U.S. PATENT DOCUMENTS

| | | | |
|---|---|---|---|
| 53,186 A * | 3/1866 | Robinson | 384/490 |
| 734,595 A * | 7/1903 | Olin | 74/50 |
| 2,047,039 A * | 7/1936 | Stevenson, Jr. | 62/403 |
| 3,834,840 A * | 9/1974 | Hartley | 417/535 |
| 5,030,065 A * | 7/1991 | Baumann | 417/273 |
| 5,846,059 A * | 12/1998 | Mizuno et al. | 417/273 |
| 6,283,723 B1 * | 9/2001 | Milburn et al. | 417/273 |
| 6,539,835 B1 * | 4/2003 | Rasmussen | 92/140 |
| 7,878,081 B2 * | 2/2011 | Sundheim | 74/50 |
| 2010/0154749 A1 * | 6/2010 | Barberato | 123/48 C |
| 2011/0026863 A1 * | 2/2011 | Chen et al. | 384/397 |

OTHER PUBLICATIONS

Screenshot of definition of "couple" from Merriam-Webster online dictionary, retrieved Apr. 10, 2013, <http://www.merriam-webster.com/dictionary/couple>.*

* cited by examiner

*Primary Examiner* — James Pilkington
*Assistant Examiner* — Richard Urbanski

(57) ABSTRACT

A high-durability cam wheel assembly mounted in a shell of a refrigerant recovery machine is disclosed to include a frame member (1) having rails (12) mounted therein, a sliding block (2) mounted inside the frame member (1) and having a plurality of sliding grooves (21) extending around the periphery thereof and kept in contact with the rails (12) of the frame member (1), and a cam wheel set (3) consisting of a first cam wheel (31) and a second cam wheel (32) arranged at two opposite sides relative to the sliding block (2) and connected to each other in an axle bearing (23) inside the sliding block (2).

6 Claims, 7 Drawing Sheets

CAM WHEEL ASSEMBLY FOR REFRIGERANT RECOVERY MACHINE

BACKGROUND OF THE INVENTION

1. Field of the Invention

The present invention relates to a cooling agent recovery technology and more particularly, to a cam wheel assembly for use in a refrigerant recovery machine for moving a piston.

2. Description of the Related Art

A conventional refrigerant recovery machine utilizes a cam wheel assembly to move piston means, causing pump members to draw in a refrigerant from the main unit of a cooler system. FIG. 7 shows a cam wheel assembly for refrigerant recovery machine according to the prior art. According to this design, the cam wheel assembly a comprises a single-piece cam wheel a1, a sliding block a2 formed of two block members a21 and arranged around the cam wheel a1, a plurality of rolling needles a5 arranged in between the cam wheel a1 and the sliding block a2, rolling balls a4 mounted in a groove a22 on an outer side of each of the two block members a21 of the sliding block a2 and an open frame member a3 formed of two frame parts a31 and arranged around the sliding block a2. The open frame member a3 comprises two sliding grooves a32 bilaterally disposed on the inside corresponding to the grooves a22 of the sliding block a2. During rotation of the cam wheel a1, the sliding block a2 is forced to move the open frame member a3 transversely back and forth, causing reciprocation of pistons b. At the same time, the sliding block a2 moves up and down in the open frame member a3.

The aforesaid prior art cam wheel assembly a is capable of reciprocating the pistons b, however it still has numerous drawbacks as follows:

1. The open frame member a3 is formed of two frame parts a31. Due to complicated shape design, the frame parts a31 must be processed through a secondary processing process. Due to necessity of a secondary processing process, the frame parts a31 are made by means of powder metallurgy. However, because the frame parts a31 are made by means of powder metallurgy, they are less rigid. In consequence, the sliding grooves a32 wear quickly subject to friction by the rolling balls a4. If a rigid material is used to make frame parts a31 by forging, casting or other techniques, the cost will be relatively increased and the follow-up processing will be complicated.

2. Because the cam wheel a1 is a single-piece member, the two block members a21 of the sliding block a2 must be mounted around the single-piece cam wheel a1 and then fastened together with the rolling needles a5 set in between the cam wheel a1 and the sliding block a2 and the rolling balls a4 mounted in the grooves a22 of the sliding block a2 before installation of the open frame member a3. If the cam wheel assembly a starts to wear or is damaged, the user cannot use substitute component parts from the market for replacement and must ask the original machine provider to provide the necessary component parts for replacement.

3. The rolling balls a4 are mounted in the grooves a22 of the sliding block a2. During displacement of the sliding block a2, the rolling balls a4 in each groove a22 will be forced to hit one another, causing noises. Further, the rolling balls a4 tend to be gathered at one side in each groove a22, causing uneven loading on the sliding block a2 and quick wearing of the sliding block a2.

SUMMARY OF THE INVENTION

The present invention has been accomplished under the circumstances in view. It is one object of the present invention to provide a cam wheel assembly for use in a refrigerant recovery machine, which enhances the lifespan of the cam wheel set subject to arrangement of sliding grooves at the sliding block and rails in the frame member.

It is another object of the present invention to provide a cam wheel assembly for use in a refrigerant recovery machine, which has the cam wheel set designed consisting of a first cam wheel and a second cam wheel, facilitating installation and saving manufacturing time.

To achieve these and other objects of the present invention, a cam wheel assembly comprises a frame member having rails mounted therein, a sliding block mounted inside the frame member and having a plurality of sliding grooves extending around the periphery thereof and kept in contact with the rails of the frame member, and a cam wheel set consisting of a first cam wheel and a second cam wheel arranged at two opposite sides relative to the sliding block and connected to each other in an axle bearing inside the sliding block.

DETAILED DESCRIPTION OF THE PREFERRED EMBODIMENT

Figure 1:
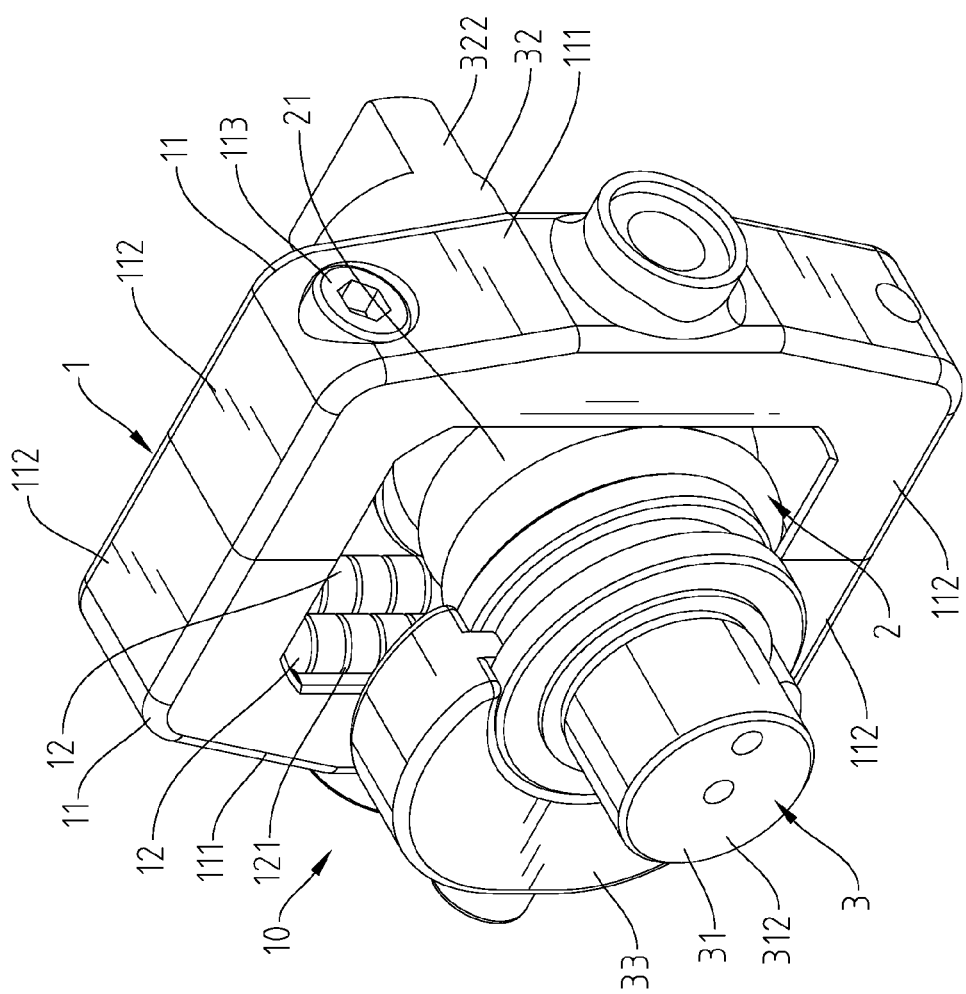
FIG. 1 is an elevational view of a cam wheel assembly in accordance with the present invention.
Figure 2:
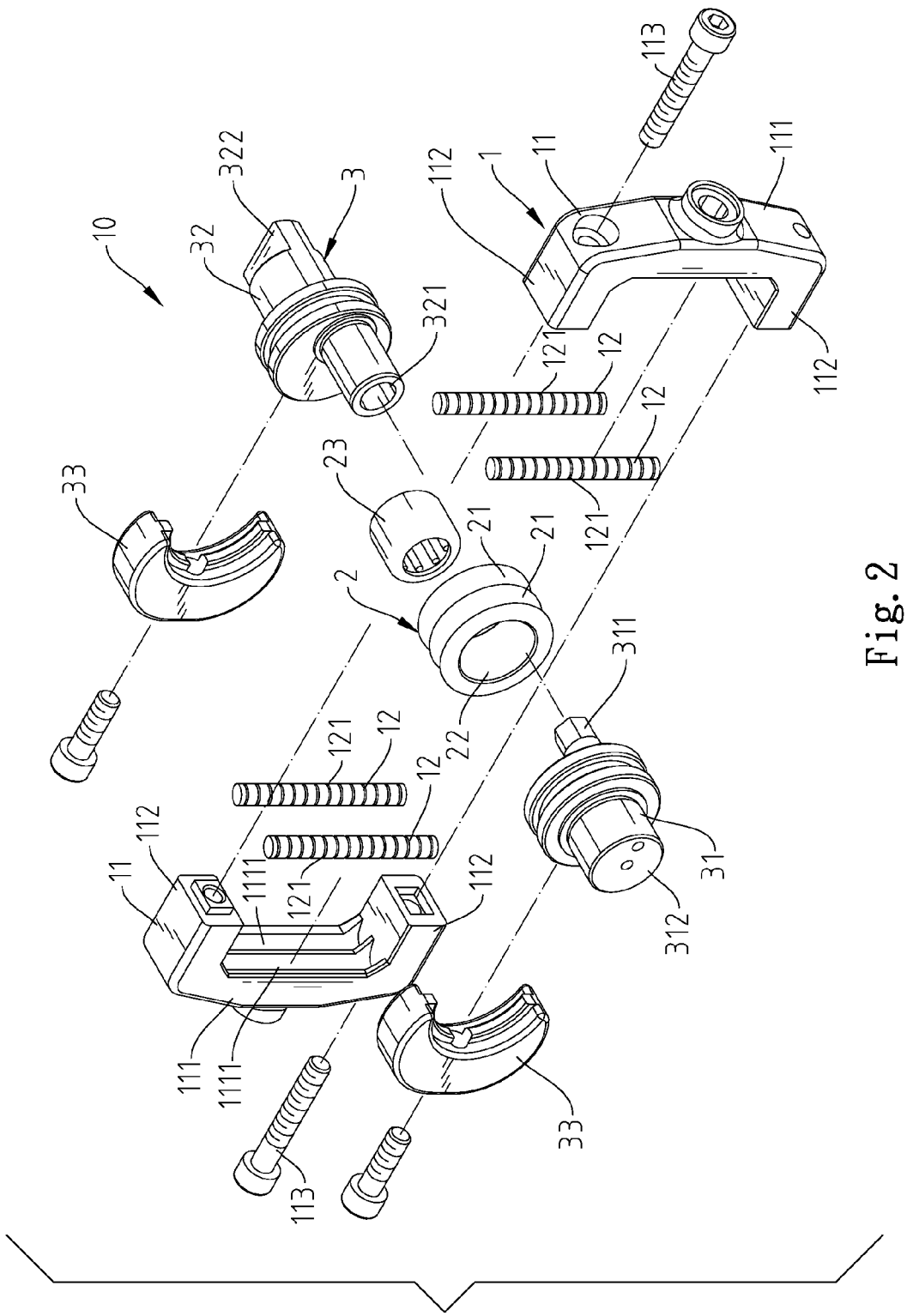
FIG. 2 is an exploded view of the cam wheel assembly in accordance with the present invention.
Figure 3:
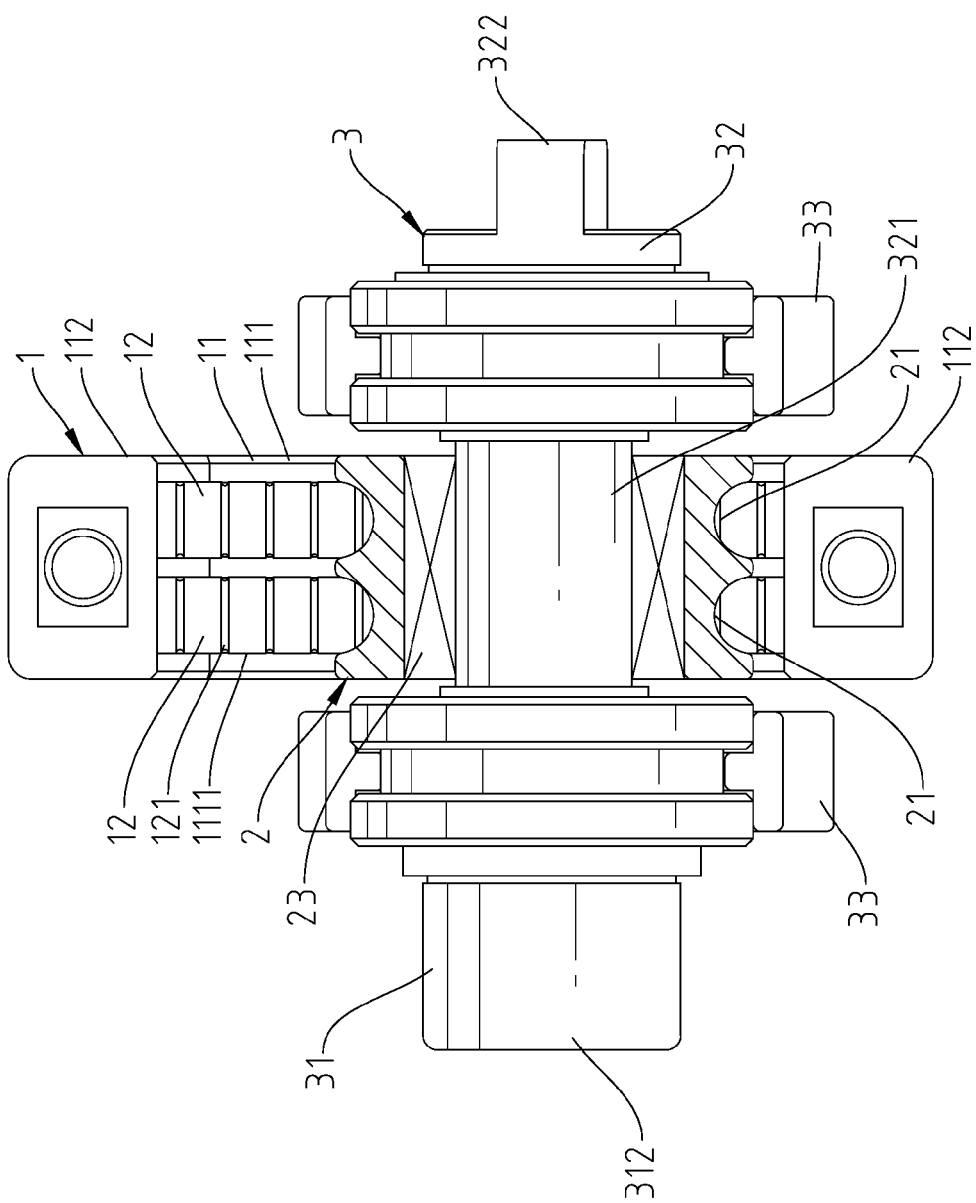
FIG. 3 is a sectional side view of the cam wheel assembly in accordance with the present invention.
Figure 4:
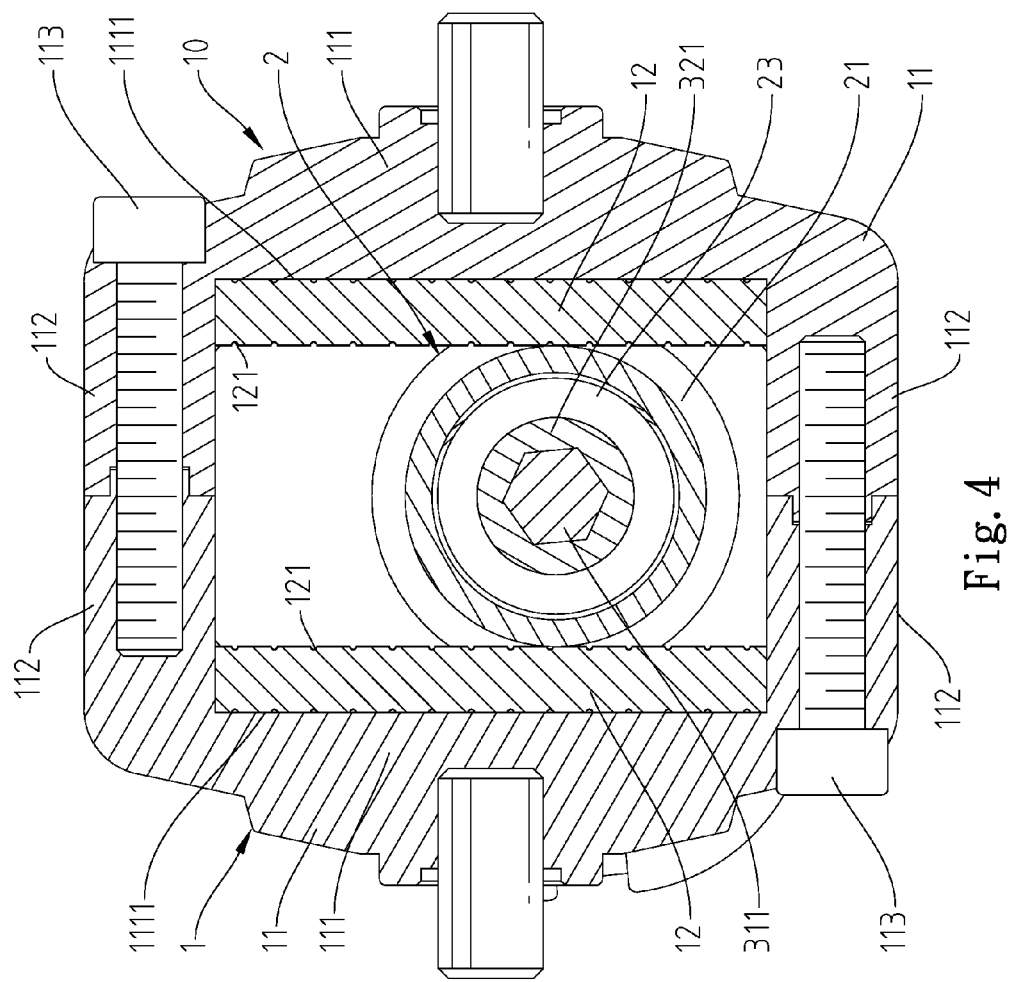
FIG. 4 is a sectional front view of the cam wheel assembly in accordance with the present invention.

Referring to FIGS. 1~4, a cam wheel assembly 10 in accordance with the present invention is shown comprising a frame member 1, a sliding block 2 and a cam wheel set 3.

The frame member 1 is an open frame formed of two symmetrical frame parts 11. Each frame part 11 comprises a base 111, and two arms 112 respectively extended from two distal ends of the base 111 in a parallel manner. The arms 112 of one of the two frame parts 11 are respectively connected to the arms 112 of the other of the two frame parts 11 by respective fastening members 113. Further, the base 111 of each frame part 11 has two locating grooves 1111 located on the inner side thereof in a parallel manner. Further, a rail 12 is mounted in each of the two locating grooves 1111 of each of the frame parts 11, and peripherally protruding over the outer surface of the respective frame part 11. Each rail 12 has oil grooves 121 extending around the periphery thereof and filled up with a lubricating oil. Further, the rails 12 can be respectively inserted into the locating grooves 1111 of the frame parts 11. Alternatively, the rails 12 can be respectively embedded in the base 111 of each of the two frame parts 11 during fabrication of the frame parts 11.

The sliding block 2 is a cylindrical member mounted inside the frame member 1, having a plurality of sliding grooves 21 extending around the periphery and kept in contact with the rails 12 of the frame member 1 and an axial through hole 22 that accommodates an axle bearing 23. The axle bearing 23 can be a ball bearing or needle bearing.

The cam wheel set 3 comprises a first cam wheel 31 and a second cam wheel 32 arranged at two opposite sides relative to the sliding block 2. The first cam wheel 31 comprises a coupling rod 311 eccentrically extended from one side thereof adjacent to the sliding block 2 and inserted into the axle bearing 23, and a pivot rod 312 perpendicularly extended from the center of an opposite side thereof. The second cam wheel 32 comprises a coupling tube 321 eccentrically extended from one side thereof adjacent to the sliding block 2 and coupled to the coupling rod 311 of the first cam wheel 31 in the axle bearing 23, and a connection rod 322 perpendicularly extended from the center of an opposite side thereof. Further, counterweights 33 are respectively mounted on the periphery of the first cam wheel 31 and the periphery of the second cam wheel 32.

Figure 5:
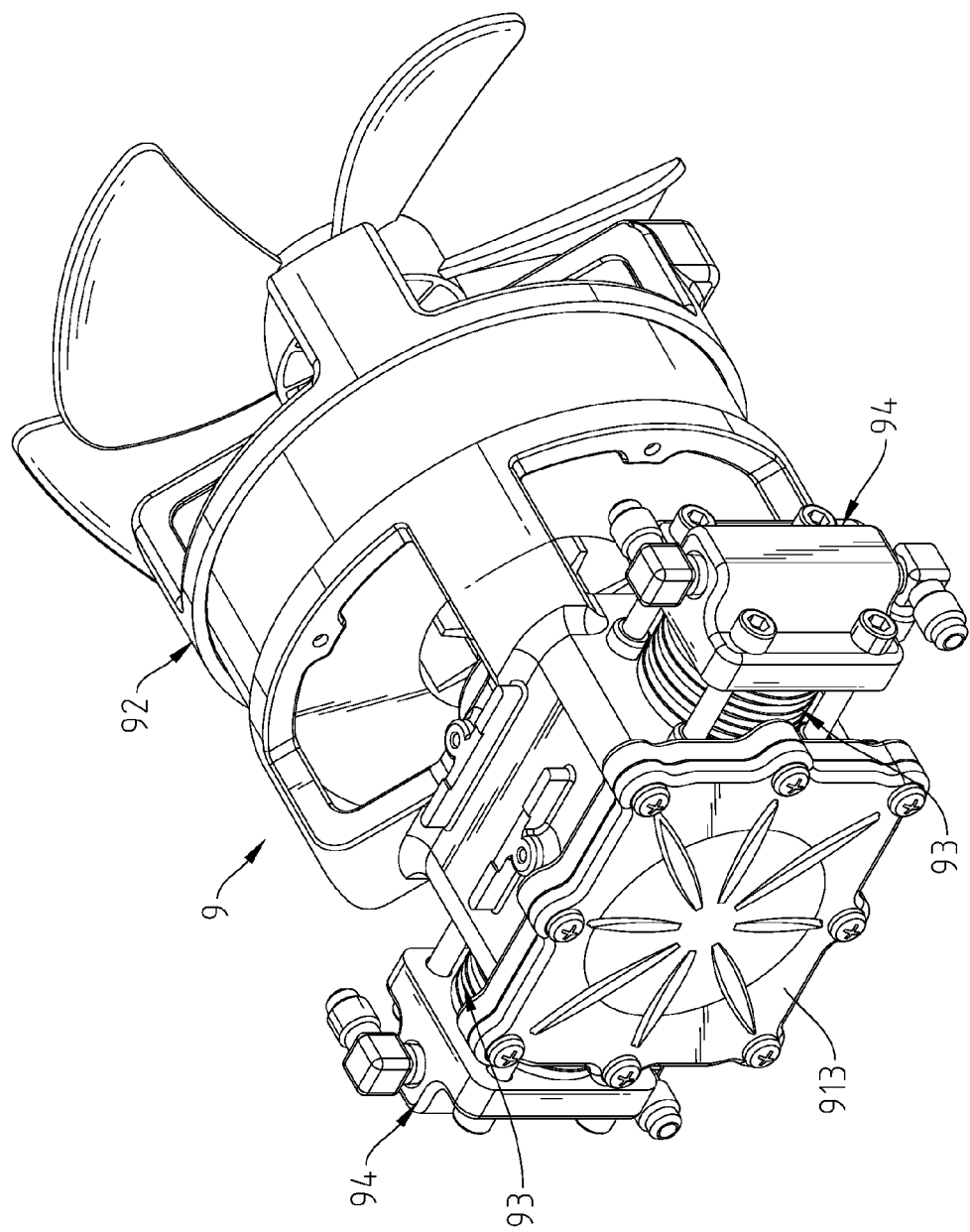
FIG. 5 is an elevational view of a refrigerant recovery machine equipped with a cam wheel assembly in accordance with the present invention.
Figure 6:
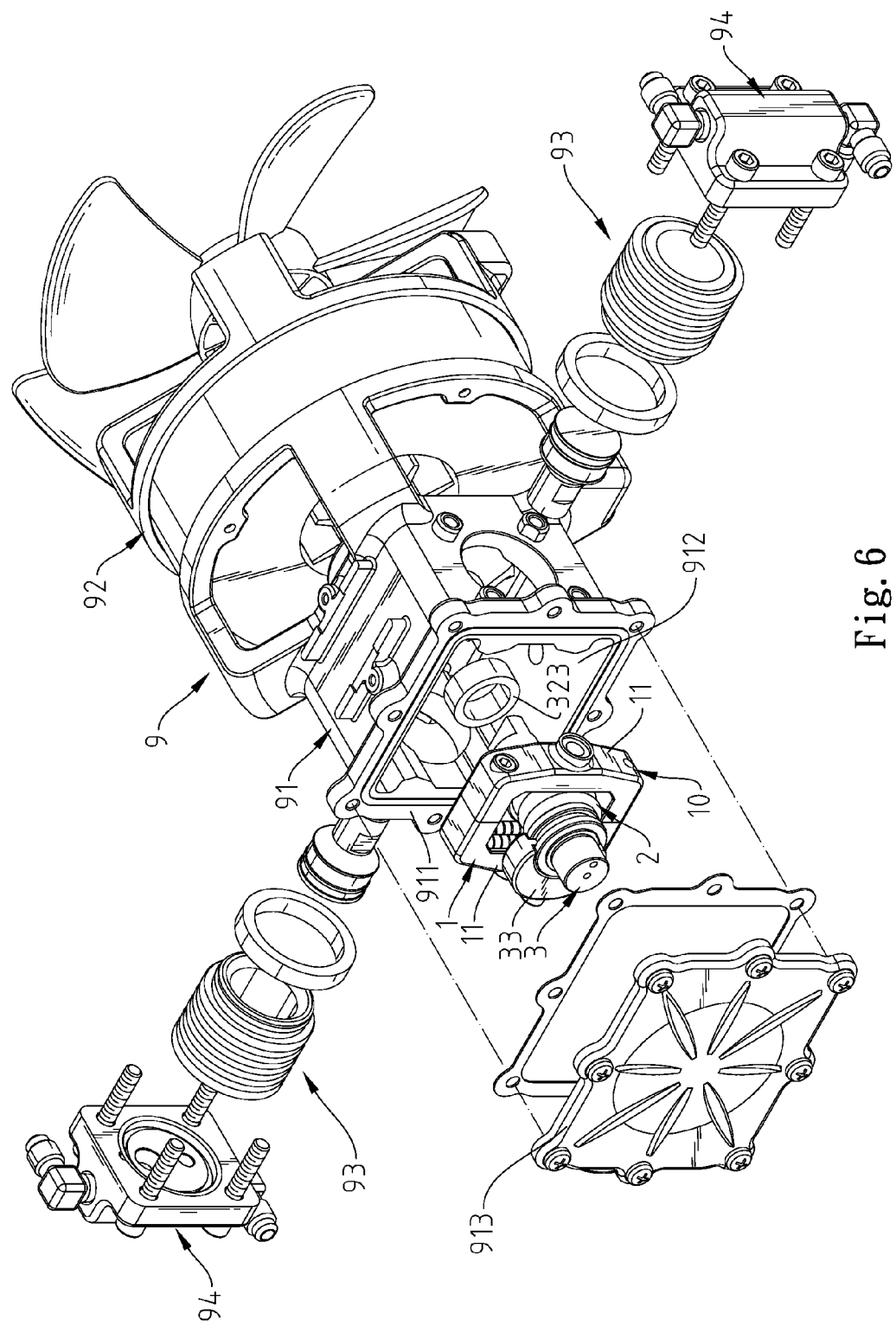
FIG. 6 is an exploded view of the refrigerant recovery machine shown in FIG. 5.
Figure 7:
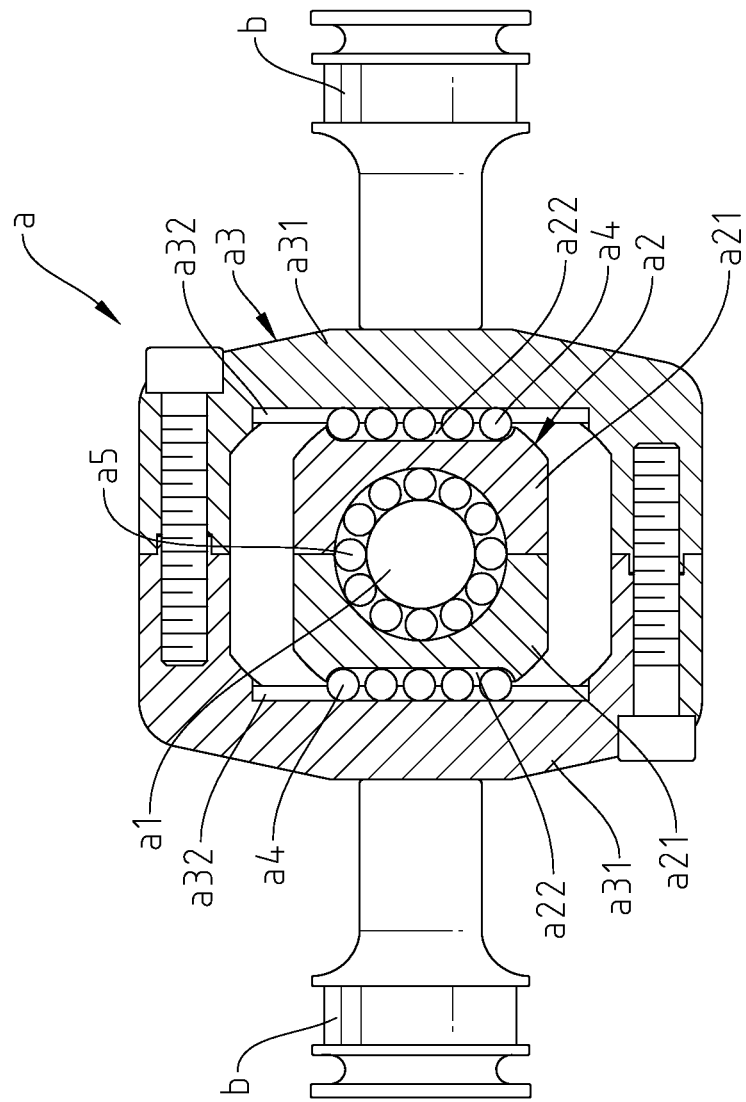
FIG. 7 is a sectional side view of a cam wheel assembly for refrigerant recovery machine according to the prior art.

Referring to FIGS. 3~6, the cam wheel assembly 10 is used in a refrigerant recovery machine 9. The refrigerant recovery machine 9 comprises a shell 91, a motor and fan set 92, two piston devices 93, and two pump component sets 94. The shell 91 comprises a shell body 911, an accommodation chamber 912 defined in the shell body 911, and a back cover 913 covering one side, namely, the rear side of the shell body 911. The motor and fan set 92 is mounted at one side, namely, the front side of the shell body 911 remote from the back cover 913. The two piston devices 93 are arranged at two opposite lateral sides of the motor and fan set 9. The two pump component sets 94 are respectively connected to the two piston devices 93. When mounting the cam wheel assembly 10 in the accommodation chamber 912 of the shell 91, connect the bases 111 of the two symmetrical frame parts 11 of the frame member 1 to the two piston devices 93 respectively, and then pivotally connect the pivot rod 312 of the first cam wheel 31 to the back cover 913, and then couple the connection rod 322 of the second cam wheel 32 to the motor and fan set 92. Further, a Teflon axle seal 323 is mounted around the connection between the connection rod 322 of the second cam wheel 32 and the motor and fan set 92.

During operation of the refrigerant recovery machine, the motor and fan set 92 drives the cam wheel set 3 of the cam wheel assembly 10 to rotate. Because the coupling rod 311 of the first cam wheel 31 and the coupling tube 321 of the second cam wheel 32 are coupled together and suspending in the axle bearing 23 in the sliding block 2 and kept away from the axis of rotation of the cam wheel set 3, rotating the cam wheel set 3 on the axis of rotation that extends axially through the pivot rod 312 of the first cam wheel 31 causes the coupling tube 321 of the second cam wheel 32 to move the sliding block 2 transversely. During transverse movement of the sliding block 2 by the coupling tube 321 of the second cam wheel 32, the sliding block 2 is moved back and forth along the rails 12 of the frame member 1, forcing the frame member 1 to move the piston devices 93 and the pump component sets 94.

In conclusion, the invention provides a cam wheel assembly for refrigerant recovery machine, which has the following advantages and features:

1. The cam wheel assembly 10 is comprised of a frame member 1, a sliding block 2 and a cam wheel set 3; the cam wheel set 3 of the cam wheel assembly consists of a first cam wheel 31 and a second cam wheel 32 arranged at two opposite sides relative to the sliding block 2. During installation, the frame member 1 and the sliding block 2 are assembled at first, and then the first cam wheel 31 and the second cam wheel 32 are respectively inserted into the axle bearing 23 in the sliding block 2 and connected to each other. This installation procedure is simple and easy. When the axle bearing 23 is damaged or starts to wear, it can be conveniently replaced with a new one by the user.

2. By means of the sliding grooves 21, the sliding block 2 can be smoothly moved back and forth along the rails 12 of the frame member 1, avoiding accidental impact and damage and prolonging the lifespan of the cam wheel assembly.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cam wheel assembly comprising:

a frame member comprising at least two symmetrical frame parts and a plurality of rails, each said frame part comprising a base and at least two arms respectively extending from two distal ends of said base, the arms of one said frame part being respectively connected to the arms of the other said frame part, the base of each said frame part comprising a plurality of locating grooves located on an inner side thereof and arranged in a parallel manner, each locating groove longitudinally extending along the base between the at least two arms, said rails being respectively mounted in the locating grooves of said frame parts and peripherally protruding over an outer surface of the associated frame part;

a sliding block mounted inside said frame member, said sliding block comprising a plurality of sliding grooves extending around the periphery thereof and kept in contact with the rails of said frame member, an axial through hole extending through two opposite ends thereof, and an axle bearing accommodated in said axial through hole; and a cam wheel set comprising a first cam wheel and a second cam wheel arranged on two opposite sides relative to said sliding block, said first cam wheel comprising a coupling rod eccentrically extending from one side thereof adjacent to said sliding block and inserted into said axle bearing and a pivot rod perpendicularly centrally extending from an opposite side thereof, said second cam wheel comprising a coupling tube eccentrically extending from one side thereof adjacent to said sliding block and directly engaged with the coupling rod of said first cam wheel in said axle bearing and a connection rod perpendicularly centrally extending from an opposite side thereof.

2. The cam wheel assembly as claimed in claim 1, wherein said cam wheel set further comprises a plurality of counterweights respectively mounted on the periphery of said first cam wheel and the periphery of said second cam wheel.

3. The cam wheel assembly as claimed in claim 1, wherein said axle bearing comprises a ball bearing.

4. The cam wheel assembly as claimed in claim 1, wherein said axle bearing comprises a needle bearing.

5. The cam wheel assembly as claimed in claim 1, wherein each said rail comprises a plurality of oil grooves extending around the periphery thereof and filled up with a lubricating oil.

6. The cam wheel assembly as claimed in claim 1, wherein said sliding block is a cylindrical member.

* * * * *